(12) United States Patent  
Kumar

(10) Patent No.: US 6,640,268 B1
(45) Date of Patent: Oct. 28, 2003

(54) DYNAMIC POLLING MECHANISM FOR WIRELESS DEVICES

(75) Inventor: Mohan Kumar, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/141,860

(22) Filed: Aug. 28, 1998

(51) Int. Cl.[7] ............................................. G06F 13/10
(52) U.S. Cl. ........................................... 710/46; 710/15
(58) Field of Search .............................. 709/226, 228, 709/225, 238; 710/241, 46–49, 15–19; 463/27; 455/67

(56) References Cited

U.S. PATENT DOCUMENTS

| | | | | |
|---|---|---|---|---|
| 4,598,363 A | * | 7/1986 | Clark et al. ................... 710/46 |
| 4,638,428 A | * | 1/1987 | Gemma et al. ............. 710/241 |
| 5,070,536 A | * | 12/1991 | Mahany et al. .......... 455/67.14 |
| 5,249,269 A | * | 9/1993 | Nakao et al. ................ 709/225 |
| 5,483,676 A | * | 1/1996 | Mahany et al. .......... 455/67.14 |
| 5,555,414 A | * | 9/1996 | Hough et al. ................ 710/261 |
| 5,659,787 A | * | 8/1997 | Schieltz ...................... 709/226 |
| 5,766,076 A | * | 6/1998 | Pease et al. .................. 463/27 |
| 5,768,148 A | * | 6/1998 | Murphy et al. ......... 364/528.21 |
| 5,787,256 A | * | 7/1998 | Marik et al. ................. 709/238 |
| 5,896,561 A | * | 4/1999 | Schrader et al. ........... 455/67.1 |
| 6,195,712 B1 | * | 2/2001 | Pawlowski et al. ............ 710/19 |
| 6,449,663 B1 | * | 9/2002 | Carney et al. ................. 710/15 |

* cited by examiner

Primary Examiner—Christopher B. Shin
(74) Attorney, Agent, or Firm—Kenyon & Kenyon

(57) ABSTRACT

In a system in which a polling devices polls one or more devices, a method and apparatus are described that allows the polling device to adjust the polling rate of all polled devices with which it is communicating based upon the activity level of each polled device. This dynamic polling scheme permits a much more efficient allocation of bandwidth than is available with static or fixed polling schemes.

52 Claims, 13 Drawing Sheets

HYSTERESIS DIAGRAM    FIG. 6

DYNAMIC POLLING MECHANISM FOR WIRELESS DEVICES

FIELD OF THE INVENTION

The present invention relates generally to communication between wireless devices. In particular, in a wireless system in which one device polls one or more other devices for information, the present invention is directed to a method and apparatus that allows the polling device to dynamically adjust the polling rate of each polled device based upon the activity level of each polled device.

BACKGROUND OF THE INVENTION

It is often necessary for electronic devices to communicate with one another in order to exchange data or to provide a centralized control mechanism for the operation of the devices within a particular environment. Typically, electronic devices communicate using an apparatus known as a "bus" or "data bus". Although a bus typically consists of a wired communications channel physically connecting devices, it is also possible to construct a bus using a wireless ("tetherless") communications channel. A wireless communications channel or a wireless bus offers significant advantages by eliminating the physical interconnect between devices.

In order to permit efficient device communication, it is necessary to establish a communications protocol. A communications protocol is a system for the exchange of information between devices and defines a particular communications architecture. For example, communicating devices are often configured in a host/peripheral relationship or a peer/peer relationship. In the host/peripheral arrangement, a host device typically communicates with one or more peripheral devices. A host periodically collects information from its peripherals or sends control information to the peripherals. The process in which a host collects information from its peripherals is known as polling. The host dictates the polling communication sequence with its connected peripheral devices by determining when each peripheral device may "talk" to the host. Under the polling process, unless the host sends permission to a peripheral device, the peripheral cannot send data to the host. The host/peripheral protocol is often referred to as an asymmetric protocol insofar as the host controls the peripherals' communication abilities.

A typical example of a host/peripheral arrangement is a personal computer (PC) and its various peripheral devices. The host PC is responsible for orchestrating the exchange of data with its peripheral devices and periodically polls all of its peripherals in order to receive data regarding their current state. For example, a host PC will periodically poll its input devices such as the mouse and keyboard to detect events such as mouse movement or the press of key on the keyboard. Upon being polled, these input devices will transmit information regarding their current state to the host PC.

In general, the time sensitivity of the data delivered from each peripheral will vary. For example, printer, keyboard and joystick peripherals will each need to deliver data to the host at different rates due to the inherent nature of their use. The printer device data may not be very time sensitive such that the printer may be able to wait for relatively long periods before sending data to the host PC. The keyboard, however, will need to send data more frequently given the average speed of a touch typist. Finally, the joystick will need to send data quite frequently to keep the host PC apprised of the position of the joystick and its buttons in order to accommodate the requirements of fast paced action games.

Because the activity level of devices will change over time, the time sensitivity of data delivered from a particular device will vary. For example, if a peripheral is not in use at all, it does not require frequent polling. On the other hand, if a peripheral suddenly enters an active state it may require an increase in its polling rate. For example, a joystick may not require frequent polling if the user of a host PC is not playing a game. However, if the user suddenly chooses to run gaming software that requires a joystick, the polling rate of the joystick should be increased.

If device polling occurs at a fixed rate, at any given time, some devices will be polled at higher rates than required for their current activity levels. Therefore, because the activity level of devices will change over time, bandwidth on the bus will be wasted in a fixed polling scheme. However, in the wired/wireless environment, bandwidth is a scarce resource that must be shared between devices on a communications channel. In order to allocate the available bandwidth efficiently, a polling device should adapt the polling rate of each polled device to meet its changing activity level.

SUMMARY OF THE INVENTION

In a wireless system in which a first device polls one or more devices for information, the present invention provides a method and apparatus for the polling device to adjust the polling rate of each polled device to reflect the activity level of each polled device. The polling device calculates the activity level of each polled device and dynamically adjusts the polling rate for each device depending on its current activity level.

DETAILED DESCRIPTION

The present invention is compatible and may be implemented in a disparate array of wireless network topologies encompassing any number of channel access schemes and modulation/coding techniques. For illustrative purposes, two embodiments are discussed herein. The first embodiment in accordance with the wireless device communications environment and protocol specified in the "Infrared BUS (IRBus) Specification," version 1.0d, February 1998 illustrates application of the present invention in a host/peripheral device environment utilizing communication frequencies in the infrared range. An alternative second embodiment, illustrates application of the invention in a peer to peer architecture in which devices communicate as master and slave on a permanent or transient basis and utilize ISM band frequencies (2.4 GHz). These two embodiments are solely by way of example to illustrate the range of applicability of the present invention and for purposes of explanation, and are not intended to limit the scope of the claims appended hereto.

In particular, in accordance with the IRBus specification, the first embodiment described herein pertains to wireless peripherals having IR transceivers and host computing devices supporting IR transceiver modules. This is solely by way of example and for the purposes of explanation, and is not intended to limit the scope of the claims appended hereto. Embodiments of the present invention can be used with a variety of wireless peripheral device technologies, including, for example, high frequency (HF), radio frequency (RF) as well as. the infrared (IR) peripherals described herein.

Further, for illustrative purposes only, in accordance with the IRBus specification, the first embodiment of the present invention discussed herein pertains to a host/peripheral device architecture. In the context of the present invention, this first embodiment allows a wireless host device to dynamically adjust the polling rate of wireless peripheral devices communicating with the host. This is solely by way of example and for purposes of explanation, and is not intended to limit the scope of the claims appended hereto. Alternative embodiments of the present invention are not limited to the host/peripheral framework. For example, the present invention may be applied in a peer/peer architecture in which one device acts as master device (polls slave devices) on a transient basis (this is illustrated by the second embodiment of the present invention, described herein).

Figure 1:
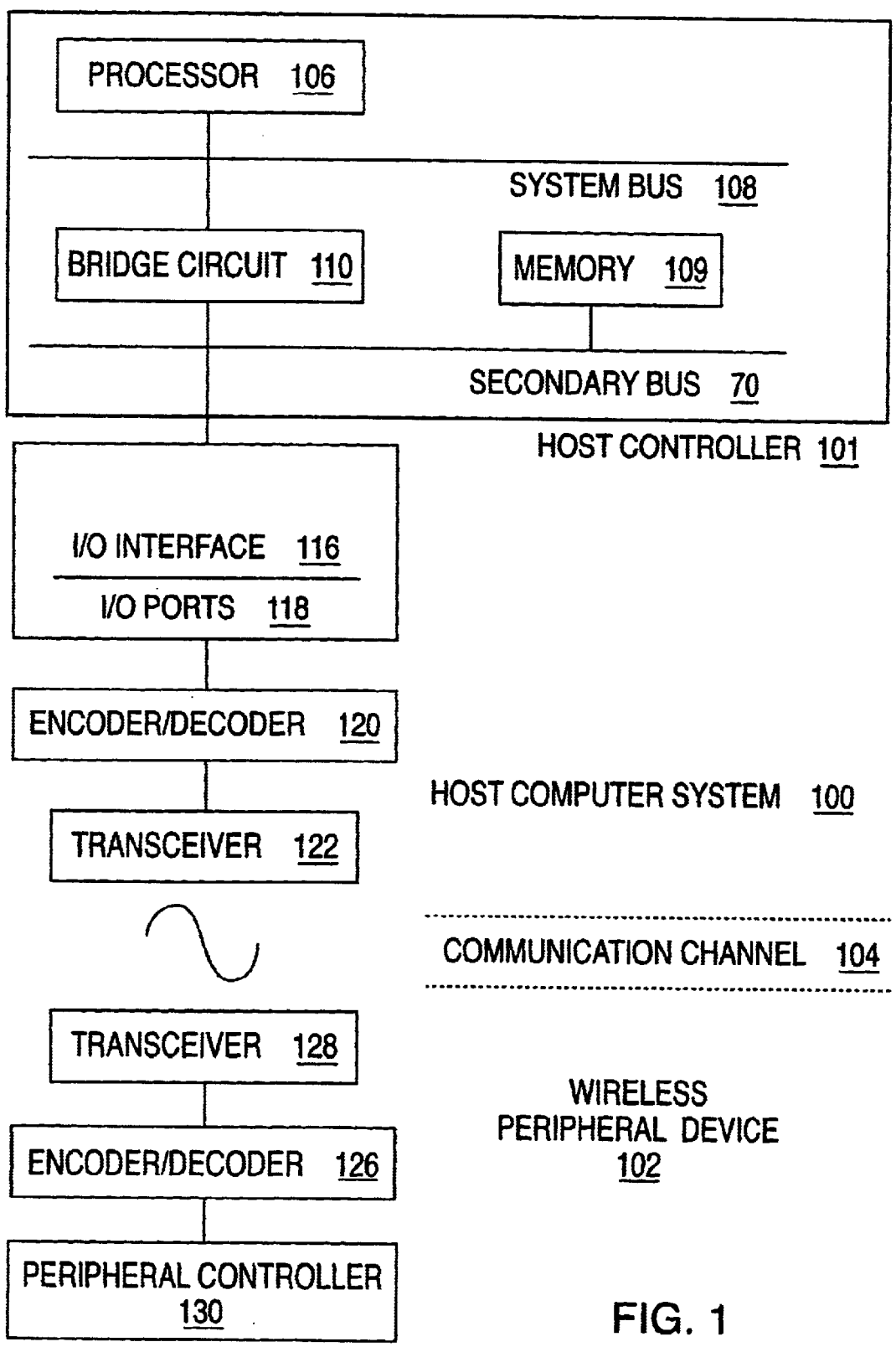
FIG. 1 is a functional block diagram depicting a host computer and wireless peripheral device according to one embodiment of the present invention.

FIG. 1 shows a host computer system 100 coupled to a wireless peripheral device 102 through a communication channel 104 in accordance with one embodiment of the invention. Computer system 100 includes a processor 106 coupled to a system bus 108 and, through bridge circuit 110, to secondary bus 70 and memory 109.

The host 100 can be, for example, a personal computer (PC), a high definition television (HDTV) system, a computer controlled home appliance, etc. Illustrative wireless peripheral devices (e.g., 102) include wireless keyboards, wireless mice (or other wireless pointing devices), wireless control consoles, wireless game-pads and wireless joysticks. Representative processors (e.g., 104) include the PENTIUM® family of processors and the 80×86 families of processors from Intel Corporation, Santa Clara, Calif. Illustrative bridge circuits (e.g., 110) include the 82443LX PCI (Peripheral Component Interconnect)-to-AGP (Advanced Graphics Port) and 82371AB PCI-to-ISA/IDE controllers made by Intel Corporation. System bus 108 may, for example, be an Intel PENTIUM® PRO bus. (See the "PENTIUM® Pro Processor Specification," update release May 1998.) Illustrative secondary buses (e.g., 70), include the universal serial bus and peripheral component interface buses. (See the "Universal Serial Bus (USB) Specification," revision 1.0, January 1996; and the "Peripheral Component Interconnect (PCI) Specification," revision 2.1S.) Memory 109 may include ROM (Read Only Memory), RAM (Random Access Memory), semiconductor memory devices such as EPROM (Erasable Programmable Read Only Memory), EEPROM (Electronically Erasable Programmable Read Only Memory) and flash devices (collectively nonvolatile RAM or NVRAM), magnetic disks (fixed, floppy, and removable), other magnetic media such as tape, optical media such as CD-ROM (Compact Disk Rom) disks, or combinations of these memories. For illustrative purposes, host computer system 100 and wireless peripheral device 102 communicate via infrared signals over communication channel 104 in accordance with the "Infrared Bus (IRBus) Specification," version 1.0d, February 1998.

Within computer system 100, communication channel 104 is controlled by input-output (I/O) interface 116. I/O interface 116 includes I/O ports 118 through which communication signals to and from individual wireless peripheral devices pass (only one such peripheral device is shown in FIG. 1). Information sent from computer system 100 to peripheral device 102 passes through I/O interface 116, is encoded by encoder/decoder 120, and injected into communication channel 104 by transceiver 122. Information received by computer system 100 from peripheral device 102 is received by transceiver 122, decoded by encoder/decoder 120, passed through I/O interface 116 and routed to processor 106 via bridge circuit 110.

Within peripheral device 102, a controller 130 controls communication to and from computer system 100. As in computer system 100, encoder/decoder 126 encodes and decodes information and transceiver 128 transmits and receives signals to/from computer system 100 by way of communication channel 104.

Figure 2:
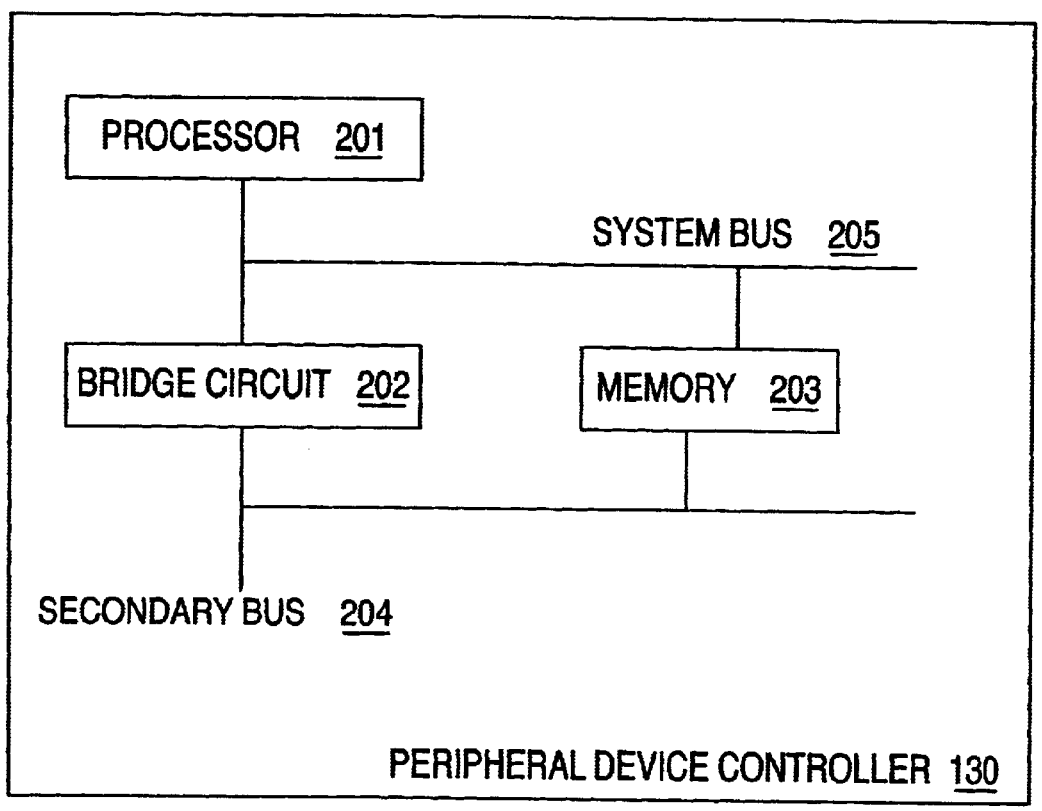
FIG. 2 is a functional block diagram depicting the device controller architecture for a wireless peripheral device according to one embodiment of the present invention.

Within wireless peripheral device 102, a peripheral controller 130 controls communication to and from the host 100. FIG. 2 depicts the architecture of a peripheral controller 130 according to one embodiment of the present invention. Peripheral controller 130 includes a processor 201 coupled to a system bus 205 and, through bridge circuit 202, to secondary bus 204 and memory 203. Representative processors (e.g., 201) include the PENTIUM® family of processors and the 80×86 families of processors from Intel Corporation.

Illustrative bridge circuits (e.g., 202) include the 82443LX PCI-to-AGP and 82371AB PCI-to-ISA/IDE controllers made by Intel Corporation. System bus 205 may, for example, be an Intel PENTIUM® PRO bus. (See the "Pentium Pro Processor Specification," update release May 1998). Illustrative secondary buses (e.g., 204), include the universal serial bus and peripheral component interface buses. (See the "Universal Serial Bus (USB) Specification," revision 1.0, January 1996; and the "Peripheral Component Interface (PCI) Specification," revision 2.1S.) Memory 203 may include ROM, RAM, EPROM, EEPROM and flash devices, magnetic disks, other magnetic media such as tape, optical media such as CD-ROM disks, or combinations of these memories.

Before communication may begin between two devices, they must establish a communication link. According to one embodiment of the present invention, the creation of a communication link between a host 100 and wireless peripheral device 102 involves two distinct stages. The first phase, enumeration, is commonly known in the context of data bus protocol and is a process where devices mutually recognize each other and initiate communication. That is, during enumeration host 100 is made aware of the presence of a peripheral device 102 within the host's operating environment and vice versa. Thus, during enumeration, host computer system 100 discovers or detects the presence of peripheral device 102, peripheral device 102 discovers and detects the presence of host device 100 and the two exchange address and identification information. In the second phase, binding, an enumerated peripheral 102 is assigned a transiently unique identifier by host 100 and added to the host's 100 communication polling cycle.

Figure 3:
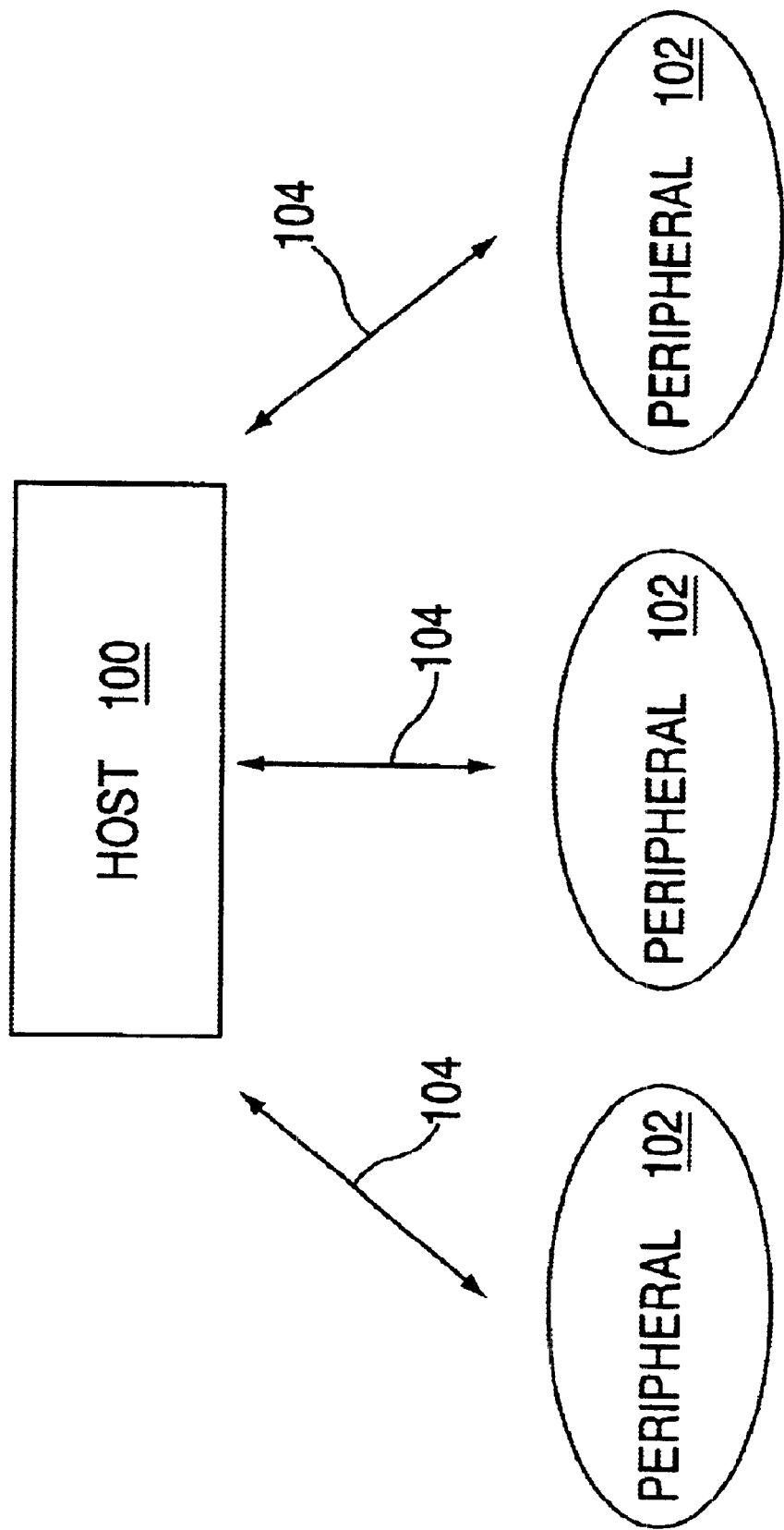
FIG. 3 depicts a host device communicating with a set of peripheral devices.
Figure 4:
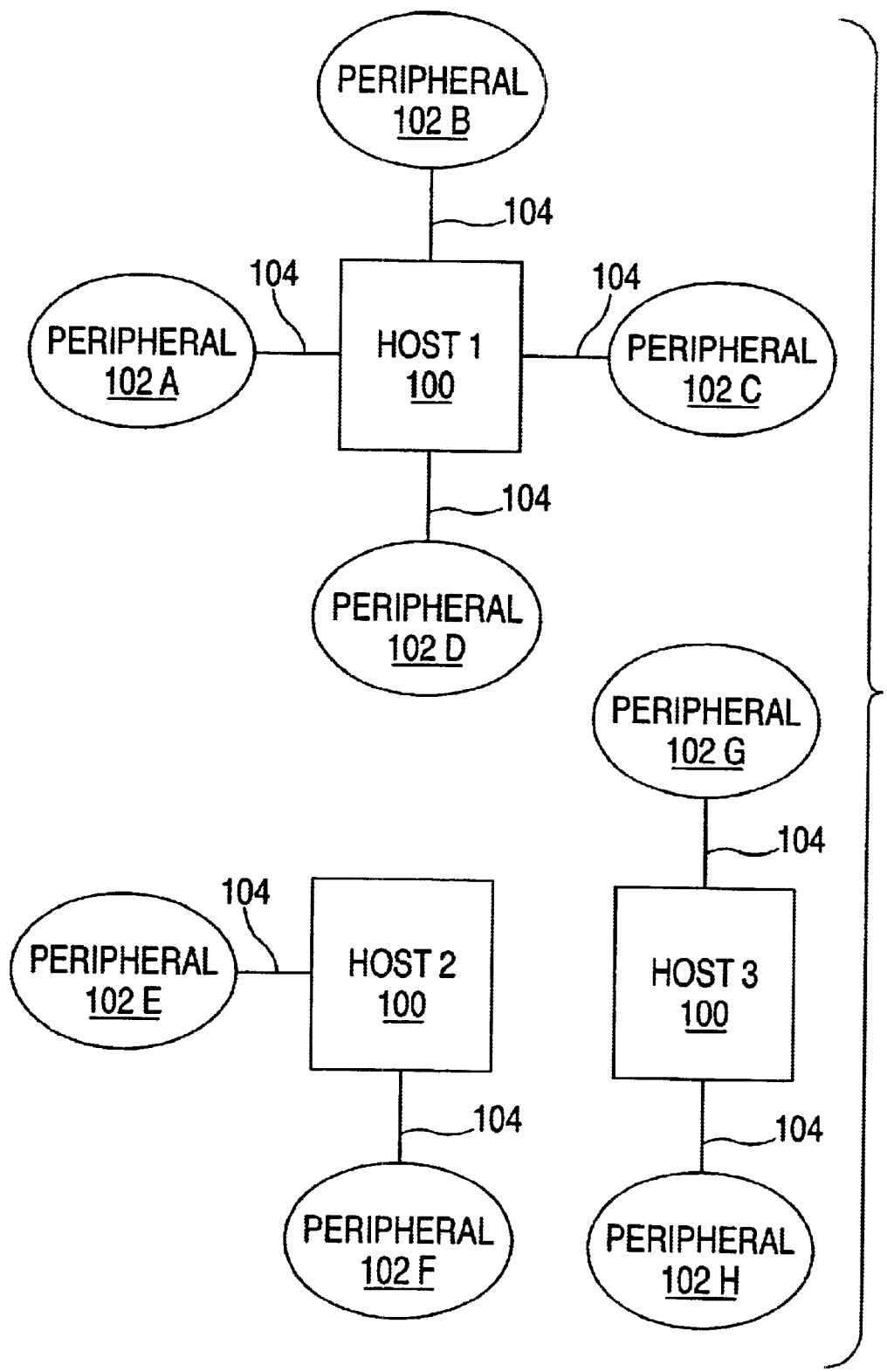
FIG. 4 depicts the message data structure for communication between a host computing device and a wireless peripheral device according to one embodiment of the present invention.

Host 100 may, at any given time, have communication links established with a plurality of wireless peripheral devices 102. That is, host 100 may be simultaneously bound to a number of wireless peripheral devices 102, with the maximum number being equal to the number of wireless peripheral ports 118 host 100 is configured to support. FIG. 3 depicts a block diagram of a host 100 bound to a plurality of wireless peripheral devices 102 (i.e., a host 100 with communication links 104 established with a plurality of wireless peripheral devices 102). In one embodiment of the present invention, host 100 manages its communication with a plurality of peripherals 102 on a time division basis (poll-response), so that those devices can communicate with a time-shared simultaneity.

Because communication between host 100 and wireless peripheral 102 occurs via electromagnetic signals sent through the air rather than through a physical cable connecting the devices, and because there may be other hosts 100 and/or peripherals 102 operating within the signal detection range of the two devices, host 100 and wireless peripheral 102 require a unique means of identifying each other. Such an identification mechanism allows peripheral 102 to distinguish communication signals sent by host 100 from signals sent by other hosts 100 that may be operating within peripheral's 102 signal detection range, and allows host 100 to distinguish communication signals sent by peripheral 102 from signals sent by other peripherals 102 operating within host's 100 signal detection range.

In one embodiment of the present invention, hosts 100 and peripherals 102 are identified by their respective addresses and identifiers. A particular host 100 is identified by a 16-bit host identifier (HostID). The HostID is a persistent value that, for example, might be stored in non-volatile memory 109 and retrieved during a power-up initialization operation. Host 100 is also identified by an 8 bit-host address (HADD), which is generated and may change each time host 100 is powered-up or reset. According to this same embodiment, peripheral 102 is identified by a 32 bit physical ID (PFID). The PFID may also be a persistent value like the HostID, which is stored in non-volatile memory and retrieved by the peripheral during power-up. A logical 4-bit peripheral address (PADD) is uniquely assigned to each peripheral 102 by host 100 during the binding process.

Typically, the ID numbers (HostID/PFID) are used in the initiation of a communication between a host 100 and a peripheral 102 (i.e. enumeration) to identify the respective devices. After the initial identification, hosts 100 and peripherals 102 are identified by their address (HADD/PADD). In order to allow this type of address identification, host 100 and a peripheral 102 exchange address/ID information (HADD/HostID and PFID) as part of the enumeration process. Then, upon binding a peripheral 102, host 100 maintains a mapping between the 4-bit PADD and the 32 bit physical ID (PFIDs) of the peripherals 102 it has currently bound.

Figure 5:
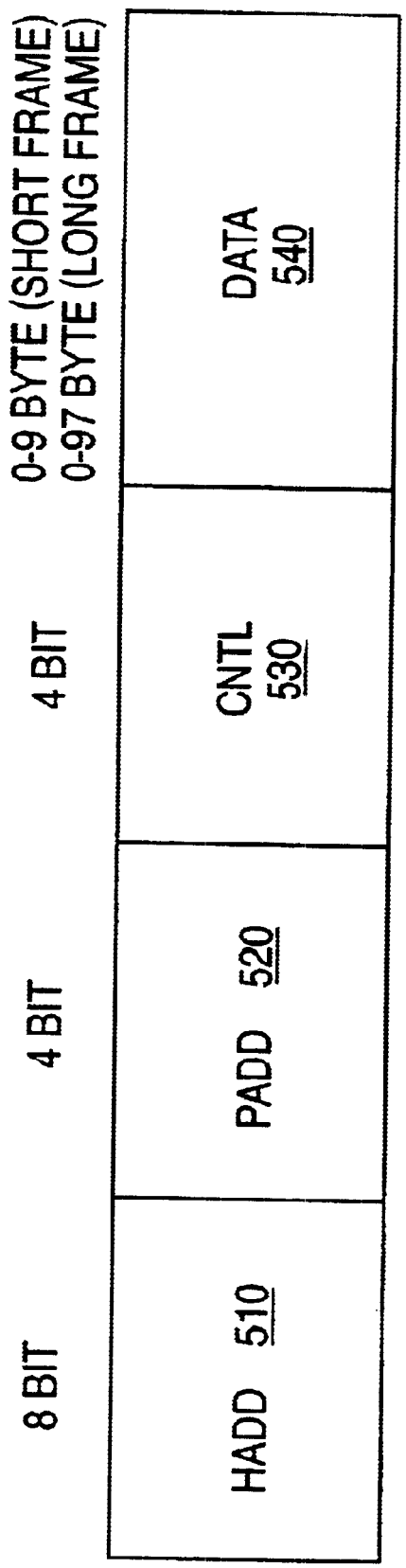
FIG. 5 depicts the hierarchy for a host's polling of critical latency and non-critical latency peripherals according to one embodiment of the present invention.

Communication between host 100 and peripheral device 102 may be mediated by a media access control (MAC) message frame structure as shown in FIG. 5. MAC frame 500 may include host address (HADD) field 510, peripheral address (PADD) field 520, control (CNTL) field 530, and data field 540. In one embodiment, designed in accordance with the IRBus specification (see reference above), these fields have the following characteristics. HADD field 510 is an 8-bit host address field that is generated each time host 100 is power-cycled or reset.

The HADD value identifies host 100 in all subsequent communication between itself and its wireless peripherals 102. PADD field 520 is a 4-bit peripheral address field that is generated and assigned to a particular peripheral device 102 during the enumeration process by host 100. Once generated, the PADD value identifies a particular peripheral device 102 in all subsequent communications between itself and its host 100. Control field 530 is a 4-bit field that identifies the type of message being transmitted (e.g., a message from host 100 to peripheral device 102) and thus the nature of the information included in the message's data field 540. Data field 540 is a variable length field (e.g., zero to 97 bytes) that carries the data being transferred between host 100 and peripheral device 102. CNTL field 530 is a 4-bit field used to send control information between hosts 100 and peripherals 102.

Once enumerated and bound, host 100 and wireless peripheral device 102 periodically communicate through the polling process using the peripheral's 102 host-assigned identifier (PADD). Polling is a periodic process in which a host 100 issues a "response permission" for each bound peripheral 102 to send data. Once a peripheral 102 has been added to a host's 100 polling loop (i.e. peripheral has been bound), the host 100 periodically "polls" the peripheral 102 to allow the peripheral 102 to send data back to the host 100.

Typically, host 100 supports peripherals 102 with varying latency requirements and thus is capable of polling peripherals 102 at different rates. In one embodiment of the present invention, host 100 supports two rates, a faster critical latency rate (CL) and a slower non-critical latency (NCL) rate. This dual polling rate scheme is only by way of example and for purposes of explanation, and is not intended to limit the claims of the present invention. The present invention is compatible with any number of multiple polling rate schemes. In one embodiment, peripheral devices are designated as CL devices (e.g. joysticks and gamepads) or NCL devices (e.g. keyboards, mice and RC (Radio Control) units). The designation of a peripheral as a CL or NCL device indicates the maximum polling rate capability of that device. The maximum polling rate supported by a peripheral 102 is specified as part of data transmitted from peripheral 102 to host 100 during the enumeration process and defines the maximum rate at which a peripheral 102 is capable of generating data (CL or NCL). CL peripherals 102 typically require higher polling rates and are designed to support these higher rates while NCL peripherals typically do not require frequent polling and are incapable of being polled at higher rates.

According to the present invention, host 100 periodically adjusts the actual polling rates of each peripheral 102 depending upon a computed peripheral activity number (PAN) for each peripheral. The PAN is a measurement of the activity level of a peripheral 102 at a Host 100 stores the current polling rate for each peripheral 102, compares the PAN with the current polling rate and on this basis determines whether the polling rate of a peripheral 102 should be increased, decreased or remain the same.

In order to effect this dynamic polling mechanism, host 100 stores a set of threshold value 610 that relate a PAN to all polling rates supported by the host 100. The derivation of the appropriate threshold values relating a PAN to a polling rate is critical to insure a stable system; an arbitrary assignment of threshold values will produce instability. In one embodiment of the present invention, the threshold values are derived by modeling a hysteresis effect in the transition between two polling rates. Hysteresis means "lag of effect", or a delay before an action and describes an actual observed physical phenomenon characterized by a "a delay in an effect when forces on a body change." Failure to incorporate hysteresis behavior in the derivation of the threshold values for a set of supported polling rates will produce unstable system behavior when polling rates are adjusted.

Figure 6:
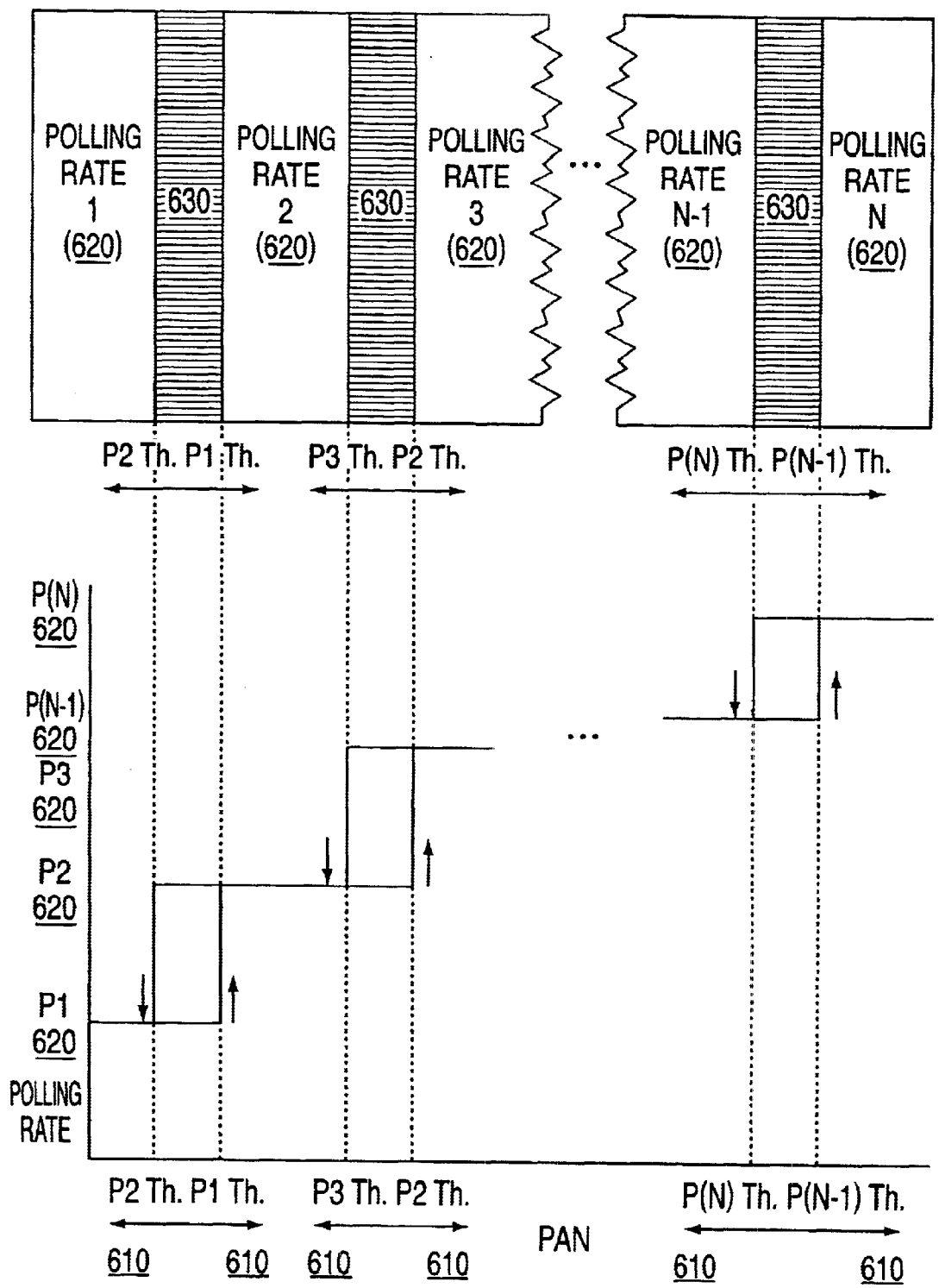
FIG. 6 depicts the relationship between polling rates and polling thresholds according to one embodiment of the present invention.

FIG. 6 depicts the relationship between a set of polling rates 620 (1–N) for a particular host 100 and the corresponding threshold PANs 610 associated with each rate. For each bound peripheral 102, host 100 selects the appropriate polling rate 620 based upon the current PAN of the peripheral 102 as well as the peripheral's 102 intrinsic polling capabilities (i.e. the maximum rate at which a peripheral 102 is capable of being polled). FIG. 6 further depicts the relationship between a set of threshold values 610 and the corresponding polling rates 620 in order to model a hysteresis effect in the transition between polling rates 620. According to one embodiment of the present invention, this hysteresis behavior is achieved by setting the threshold value 610 (transition point) from one polling rate 620 to another 620 in the increasing direction as different from the threshold value 610 between the two polling rates 620 in the decreasing direction. Thus, there is a transition area 630 between polling rates in which the same range of PANs map to two different polling rates 620 depending upon whether the PAN of a peripheral 102 is increasing or decreasing. This allows a stable change between polling rates especially if the PAN of a peripheral 102 fluctuates by small amounts at the crossover-point between polling thresholds. If the threshold between polling rate 1 (610) and polling rate 2 (610) were identical with the threshold value between polling rate 2 (610) and polling rate 1 (610) it is likely that a polled device would enter an unstable state of fluctuation between polling rates.

In order to adjust the polling rate 620 according to a set of threshold values 610, the following procedure is utilized. If the PAN of peripheral device 102 exceeds the threshold for the current polling rate 610 (in the increasing direction), the polling rate of peripheral 620 is adjusted to meet the highest possible polling rate 620 supporting the new PAN so long as the peripheral 102 is intrinsically capable being polled at the higher polling rate 620. If the PAN of peripheral 102 declines below the threshold value for the current polling rate 610 (in the decreasing direction), host 100 adjusts the polling rate of peripheral 620 to the highest polling rate supported 620 by the new PAN of the peripheral. Thus, for example, referring to FIG. 6, if a peripheral 102 were originally polled at rate 1, and the PAN of the peripheral 102 suddenly increased to a value that exceeded threshold PAN for rate 1 in the increasing direction (610), host 100 would increase the polling rate of peripheral 620 to polling rate 2. However, if a peripheral 102 was originally being polled at poling rate 3 (610) and the PAN of the peripheral 102 declined below the threshold value for rate 3 in the decreasing direction (610), host 100 would decrease the polling rate of the peripheral 620 to polling rate 1.

Because the polling rate of each peripheral 102 must be dynamically adjusted, host 100 periodically calculates the PAN for each bound peripheral 102 and adjusts all polling rates 620 based upon the threshold PAN values 610. According to one embodiment, host 100 keeps a running count of the number of polls to each of its bound peripherals 102 (PollCount) and the number of responses with new data from each peripheral 102 (NewDataResponseCount) (NAK (No Acknowledge) responses are not counted as new data). For each peripheral 102, host 100 computes the PAN by taking the ratio of the number of new data responses received from the peripheral 102 to the number of polls sent to the peripheral 102. If the PAN of a particular peripheral 102 exceeds the increasing threshold value 610 for the current polling rate of the peripheral 620, host 100 increases the polling rate for that peripheral 102 to higher rate 620 supported by the PAN of the peripheral and in conformance with the maximum polling rate 620 intrinsically supported on the peripheral 102. Similarly, if the PAN of a peripheral 102 falls below the decreasing threshold for the current polling rate of the peripheral 620, host 100 lowers the polling rate 620 for that peripheral 102 to a rate 620 appropriate for the current PAN. The method described herein for the computation of the PAN is solely by way of example and for purposes of explanation, and is not intended to limit the claims appended hereto.

Figure 7:
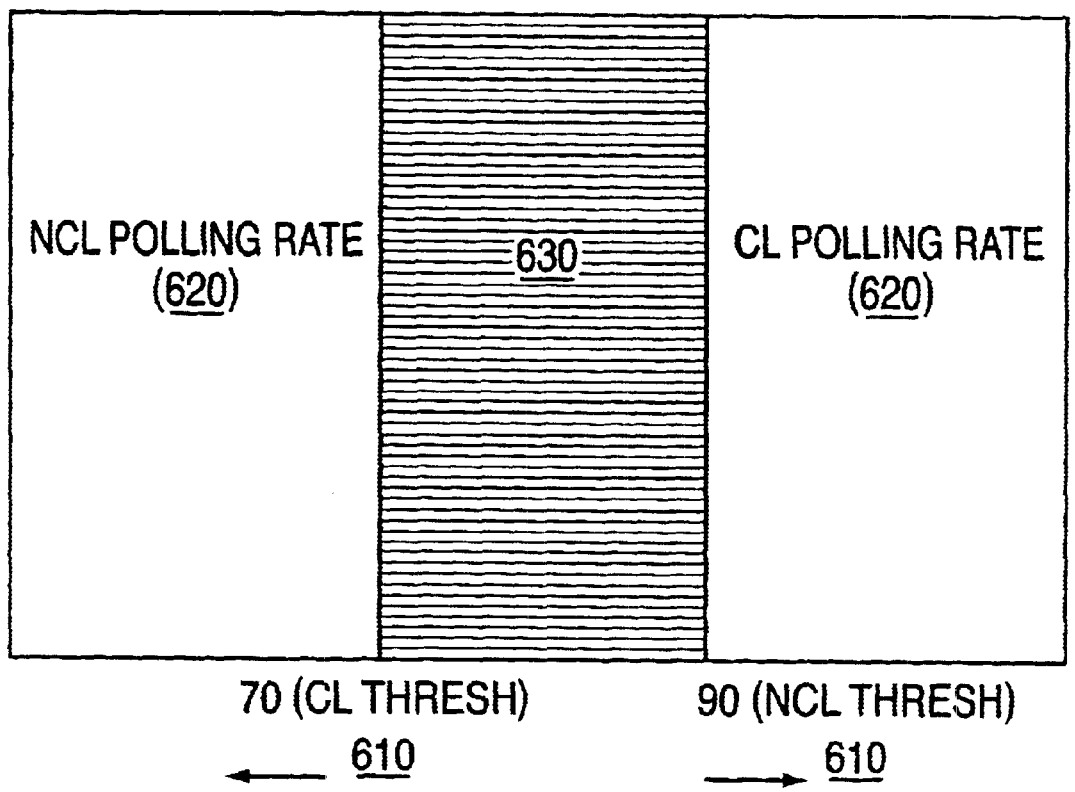
FIG. 7 depicts the relationship between polling rates and polling thresholds in one embodiment of the present invention employing CL and NCL polling rates.

FIG. 7 depicts an example of an embodiment of the present invention in which only CL and NCL polling rates 620 are supported. However, a CL peripheral 102 (such as a joystick) is not always polled at the CL polling rate 620. Host 100 varies the polling rate of each bound peripheral 102 depending upon the PAN of the peripheral 102. For example, referring to FIG. 7, when a CL peripheral's 102 PAN decreases below the CL threshold value 620 (90), host 100 decreases the polling rate for the peripheral 102 to the NCL polling rate 620. Alternatively, when the PAN of a CL peripheral 102 initially being polled at the NCL rate 620 exceeds the NCL threshold (70), the host increases the polling rate 620 of the peripheral 102 to the CL polling rate 620. FIG. 7 further illustrates the modeling of a hysteresis effect in the transition between polling rate (i.e. increasing threshold=90, decreasing threshold=70). This scheme allows great flexibility while preserving bandwidth. For example, NCL peripherals 102 (such as a keyboard) could specify the CL polling rate as a maximum polling rate. This would allow such peripherals 102 to be treated as CL peripherals 102 only when the device activity requires—i.e. when the PAN of a peripheral 102 exceeds the threshold for the NCL polling rate 620.

Figure 8:
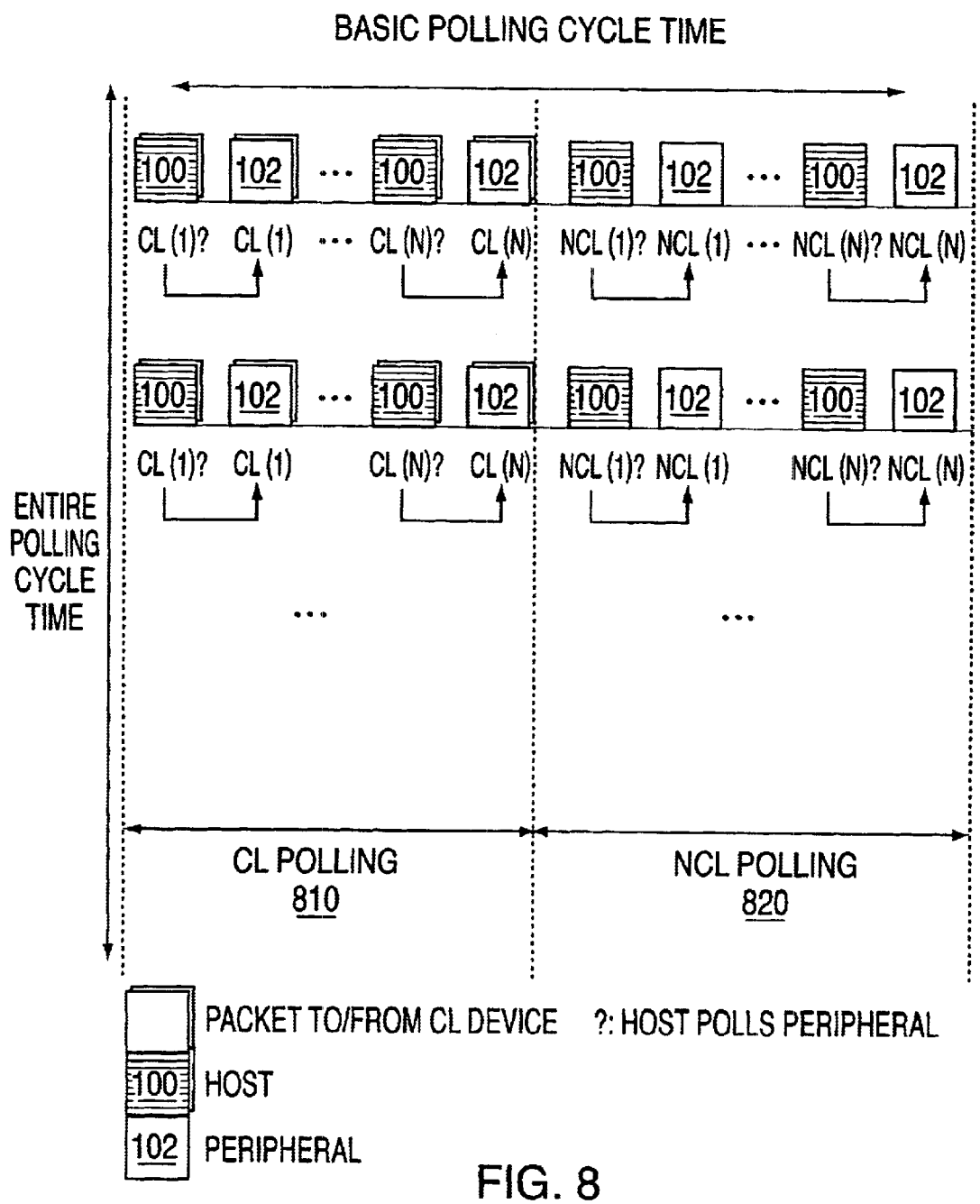
FIG. 8 depicts the hierarchy for a host's polling of CL and NCL peripherals according to one embodiment of the present invention.

FIG. 8 depicts the hierarchy for a host's 100 polling of CL and NCL peripherals 102 according to one embodiment of the present invention. So long as host 100 has bound at least one CL peripheral 102 operating at the CL polling rate 620, the polling cycle time is fixed at 13.8 ms guaranteeing that host 100 will transmit a frame to each of its bound CL rate peripherals 102 every 13.8 ms (the CL polling rate). All peripherals 102 being polled at the CL polling rate 620 are polled first (in cycle time 810).

If host 100 finishes polling all of its bound CL peripherals 102 operating at the CL rate 620 in less than 13.8 ms (810), host 100 will use the remaining time in the polling cycle (in cycle time 820) to poll NCL peripherals 102 and to poll for new peripherals 102 requiring binding. Host 100 is guaranteed to poll a bound NCL peripheral 102 and poll for new bindings every 69 ms. In determining which NCL peripherals 102 to poll in the remainder of a polling cycle 820, host 100 will prioritize those peripherals 102 that are approaching 69 ms since their last poll. If no CL peripheral 102 at the CL polling rate 620 is bound, host 100 polls all of the bound NCL rate peripherals 102 and then hails for binding of new devices 620.

Figure 9:
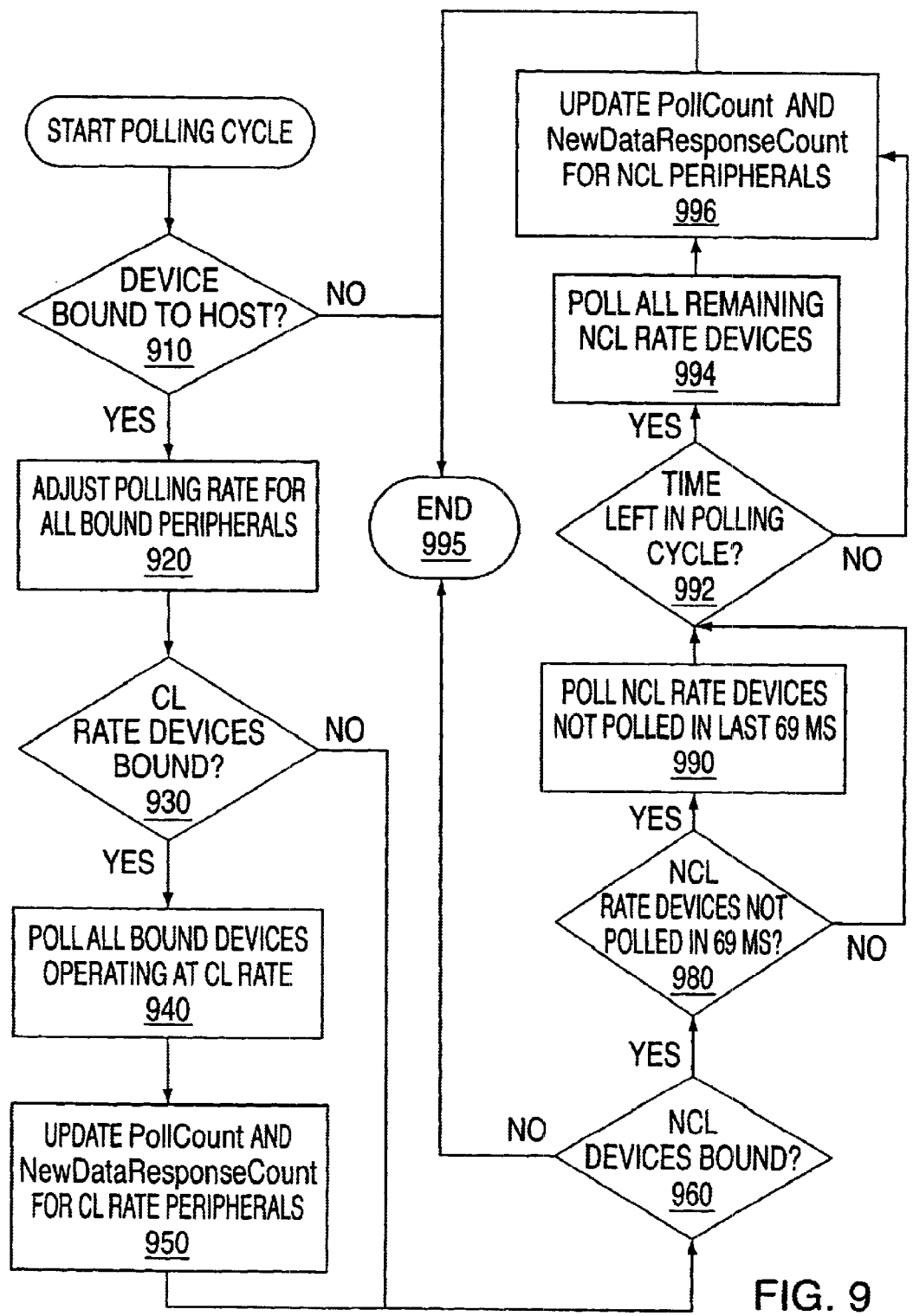
FIG. 9 is a flowchart depicting the polling cycle steps according to one embodiment of the present invention.

FIG. 9 depicts the polling cycle steps according to one embodiment of the present invention. First, host 100 checks whether there are any bound peripheral devices 102 (step 910). If there are no bound peripherals 102 ('no' branch of step 910), the procedure ends (step 995). If there are bound peripherals 102, ('yes' branch of step 910) host 100 adjusts the polling rate of any bound peripherals 102, if required (step 920 described in detail below in FIG. 10). If there are no peripheral devices 102 operating at the CL polling rate ('no' branch of step 930), host 100 looks for peripheral devices 102 operating at the NCL polling rate (step 960). Assuming there are bound peripheral devices 102 at the CL rate ('yes' branch of step 930), host 100 polls these devices 102 first (step 740). Host 100 then updates a variable representing the number of polls sent to the current peripheral 102 (PollCount) and a variable representing the number of data responses received from the current peripheral 102, exclusive of NAK's (NewDataResponseCount) for all CL rate peripherals 102 it has polled (step 950).

After all CL rate peripheral devices 102 have been polled or if there are no bound CL rate devices 102, host 100 checks whether there are any bound NCL peripheral devices 102 (step 960). If there are no bound NCL rate devices 102 ('no' branch of step 960), the procedure ends (step 995). If there are NCL rate devices 102 bound ('yes' branch of step 960), host 100 checks whether any of these devices 102 have not been polled within 69 ms (step 980). If there are NCL devices 102 that have not been polled within the last 69 ms ('yes' branch of step 980), host 100 polls these devices 102 first (step 990). If time has expired in the polling cycle ('no' branch of step 992), host 100 updates the poll count (PollCount) and data response count (NewDataResponseCount) for all NCL rate peripherals 102 (step 996) and the procedure ends (step 995). Otherwise, with the remaining time left in the polling cycle ('yes' branch of step 992) host 100 polls any remaining NCL rate peripherals 102 (step 794). Finally, host 100 updates the poll count (PollCount) and data response count (NewDataResponseCount) for all NCL rate peripherals 102 (step 996) and the procedure ends (step 995).

Figure 10:
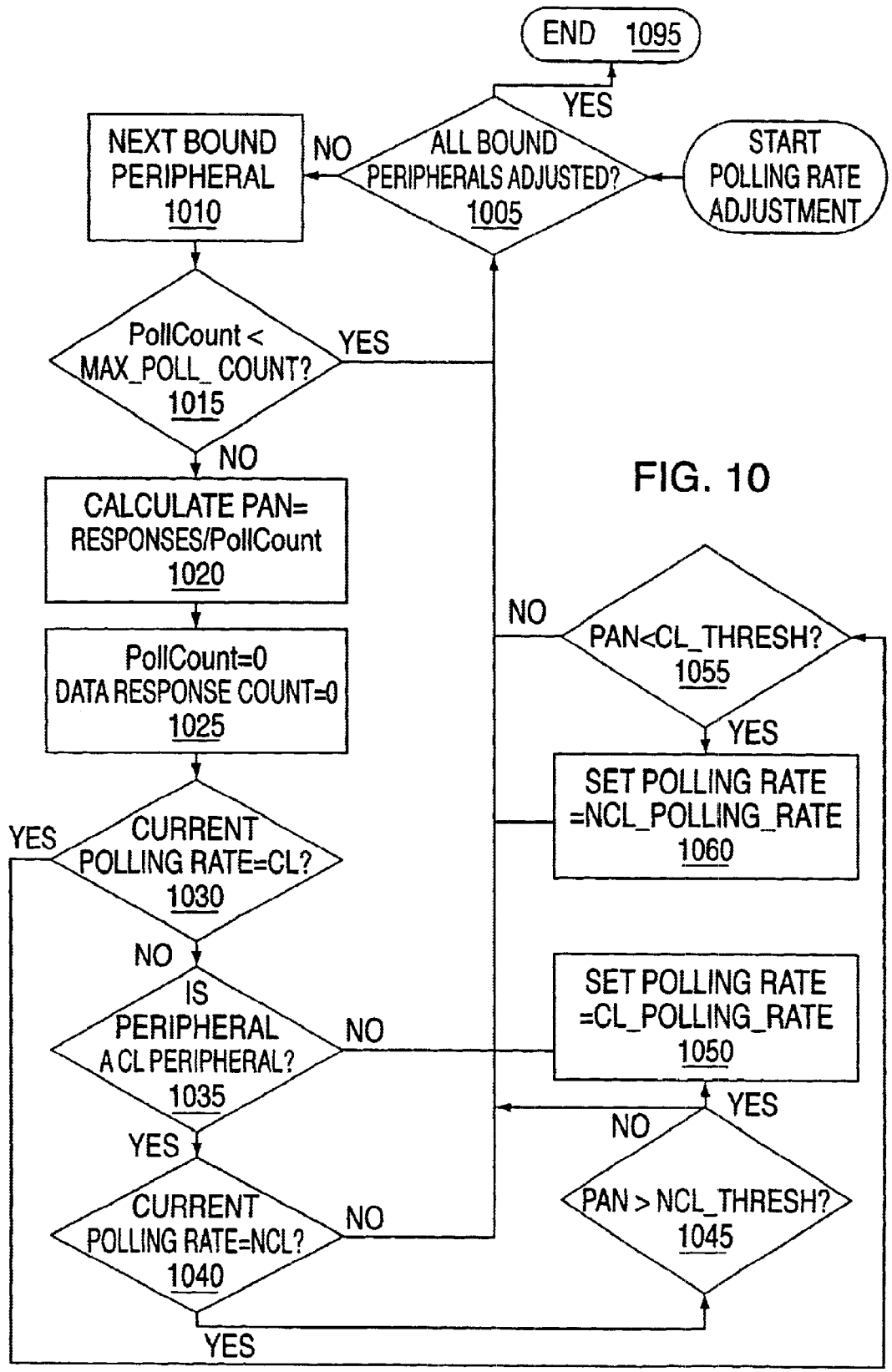
FIG. 10 is a flowchart depicting the host's procedure for the adjustment of the polling rate of all bound peripherals according to one embodiment of the present invention.

FIG. 10 depicts the host's 100 procedure for adjustment of the polling rate of all bound peripherals 102 according to one embodiment of the invention. Host 100 first checks whether all bound peripherals 102 have been adjusted (step 1005). If all bound peripherals 102 have been adjusted ('yes' branch of step 1005), the procedure ends (step 1095). If there are peripherals 102 requiring polling rate adjustment ('no' branch of step 1005), host 100 considers the next bound peripheral 102 (step 1010). If the number of polls sent to the current peripheral 102 (PollCount) is less than the maximum poll count (MAX_POLL_COUNT), ('yes' branch of step 1015), the peripheral 102 under consideration is not ripe for polling rate adjustment and host 100 considers the next bound peripheral 102, if any (step 1005).

If the number of polls sent to the current peripheral (PollCount) 102 equals or exceeds MAX_POLL_COUNT ('no' branch of step 1015), host 100 then calculates the PAN for the current peripheral 102 by dividing the number of data responses (NewDataResponseCount) by the number of polls (PollCount) for that peripheral 102 (step 1020). Host 100 then resets the variables in computer memory tracking the number of polls (PollCount) and data responses (NewDataResponseCount) for the current peripheral 102 to zero (step 1025). Next, host 100 determines whether the polling rate for the current peripheral should be increased, decreased or maintained.

First, host 100 checks whether the current polling rate for the peripheral 102 is at the CL rate (step 1030). If the current polling rate is at the CL rate, host 100 executes a series of steps to determine whether the polling rate should be reduced to the NCL rate ('yes' branch of step 1030) (described below). If the current polling rate is not at the CL rate (i.e. NCL) ('no' branch of step 1030), host 100 queries whether the peripheral 102 supports CL rate polling (step 1035) (information transmitted during enumeration). If the peripheral 102 does support CL polling ('yes' branch of step 1035), the current polling rate is NCL ('yes' branch of step 1040) and the PAN as calculated (in step 1020) exceeds the CL threshold value ('yes' branch of step 1045), host 100 sets the current polling rate to the CL polling rate (step 1050). Host 100 then proceeds to consider other bound peripherals 102, if any (step 1005).

If the polling rate for the current peripheral 102 is at the NCL rate ('yes' branch of step 1030), host 100 examines whether the PAN (as calculated in step 1020) falls below the CL threshold value (step 1055). If the PAN falls below the CL threshold value ('yes' branch of step 1055), host 100 sets the current polling rate to the NCL rate (step 1060). If the PAN exceeds the CL threshold value ('no' branch of step 1055), host 100 looks for any remaining bound peripherals 102. Host 100 repeats this procedure until all bound peripherals 102 have been analyzed ('yes' branch of step 1005) upon which, the procedure ends (step 1095).

The following pseudo-code describes an embodiment of the present invention:

Steps:

define MAX_POLL_COUNT 100 define CL_PERIPHERAL_THRESHOLD 70//70 out of 100 polls result in new data define NCL_2_CL_PERIPHERAL_THRESHOLD 90//90 out of 100 polls result in new data define CL_POLLING_RATE 1 define NCL_POLLING_RATE 2 int AdjustPollingRate( )

```
{
int pan; //peripheral activity number
for Each bound peripheral 'p' do {
    if (PollCount for peripheral 'p' <MAX_POLL_COUNT)
        return;
//PollCount for peripheral 'p' has reached MAX_POLL_COUNT
PollCount=0; //Reset PollCount for peripheral 'p'
pan=NewDataResponseCount for the peripheral; //pan for
peripheral 'p'
NewDataResponseCount=0; //Reset NewDataResponseCount
for peripheral 'p'
//if CL peripheral activity has dropped below its defined threshold drop the
//polling rate for this peripheral
if (CurrentPollingRate for peripheral == CL_POLLING_RATE) &&
    (pan<CL_PERIPHERAL_THRESHOLD) {
    CurrentPollingRate for peripheral=NCL_POLLING_RATE;
```

```
}
//if a peripheral activity exceeds the NCL peripheral threshold,
//poll the peripheral at the Critical Latency Rate (CL)
else if (Peripheral 'p' is a Critical Latency Peripheral &&
    (CurrentPollingRate for peripheral == NCL_POLLING_RATE) &&
    (pan>=NCL_2_CL_PERIPHERAL_THRESHOLD)) {
    CurrentPollingRate for peripheral = CL_POLLING_RATE;
}
}
}
}
```

The present invention is compatible and may be implemented in a disparate array of wireless network topologies encompassing any number of channel access schemes, frequency band ranges and modulation/coding techniques. For example, for illustrative purposes herein, the following discussion describes an alternative embodiment of the present invention in accordance with a different wireless device communication environment and protocol. This is solely by way of example and for purposes of explanation, and is not intended to limit the scope of the claims appended hereto. An alternative embodiment utilizes a short-range, low current consumption, radio-based wireless network architecture and protocol designed to work in the 2.4 GHz ISM band and is capable of handing both data and voice. This embodiment uses an adhoc network structure consisting of a number of subnets called piconets connected together into one large network referred to as a Scatternet.

According to one embodiment, all devices are peer devices using identical radios. According this same embodiment, devices communicate as peers but act as masters or slaves on a permanent or transient basis. At the start of a connection between two devices, the initializing device is temporarily assigned as a master device. This assignment is only valid during the connection. The master device initiates the connection and controls the traffic of up to a maximum of seven active slave devices.

According to one embodiment, a piconet (subnet in the Scatternet) consists of a master device and up to seven slave devices connected via point-to-point and point-to-multipoint link.

Figure 11:
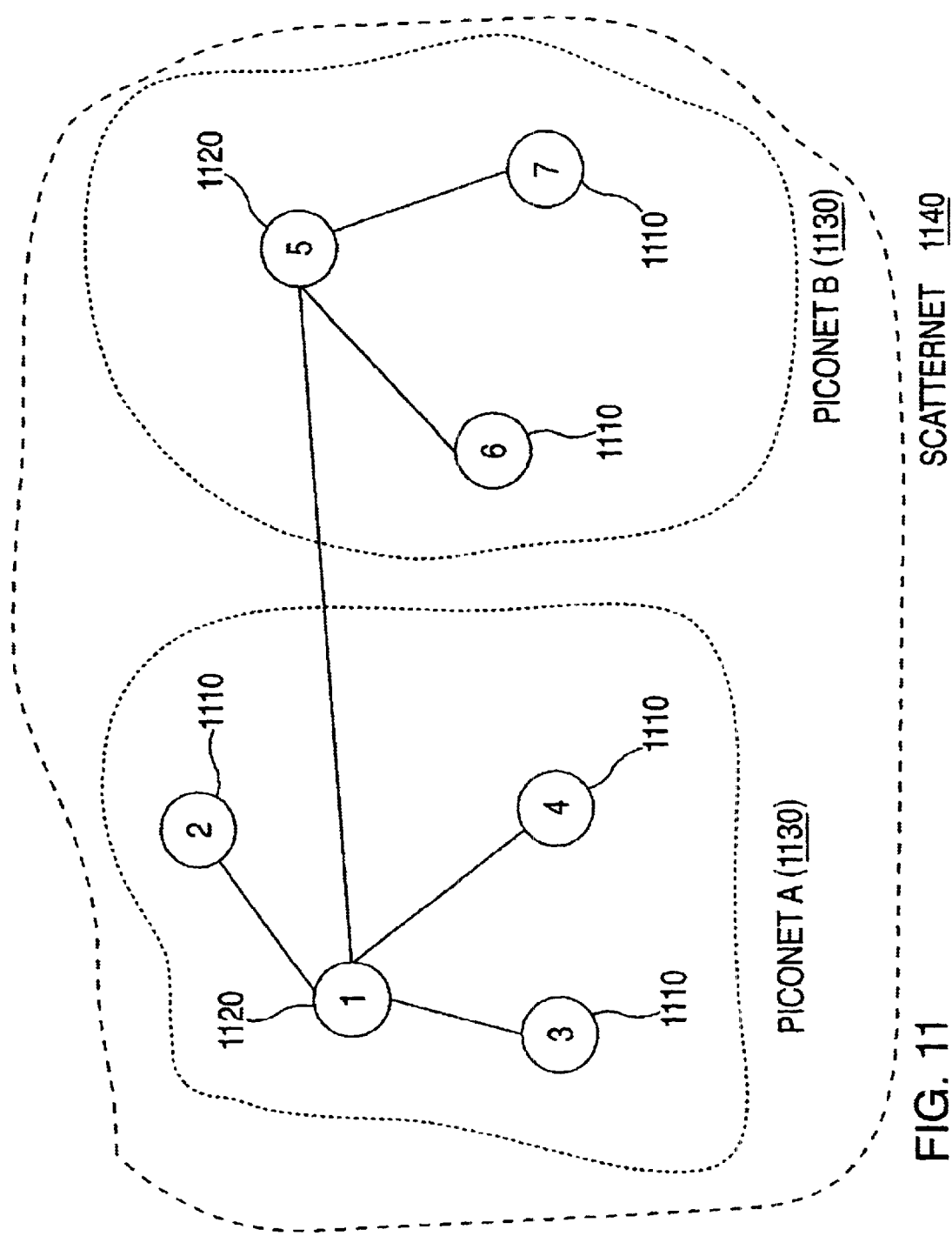
FIG. 11 depicts a Scatternet comprising two piconets according to one embodiment of the present invention.

FIG. 11 depicts a Scatternet (1140) consisting of two piconets. Slave devices 2, 3 and 4 (1110) communicate with master device 1 (1120) in piconet A (1130). Slave devices 6 and 7 communicate with master device 5 (1120) in piconet B. A 3-bit active member address is used to identify each device connected on the piconet.

According to one embodiment, a frequency hopping spread spectrum modulation technology is employed. Frequency hopping is a modulation technique in which the data signal is modulated with a carrier frequency that periodically changes according to a pre-defined set of "hopping" frequencies or "hopset". The carrier frequency of the digitally modulated data is "hopped" over a wide range of frequencies prescribed by a periodic code. In a frequency hopping system, each user employs a different hopping pattern; interference occurs when two different users land on the same hop frequency. If the codes are synchronized and the hopping patterns are selected so that two users never hop to the same frequency at the same time, interference between users is eliminated (orthogonal sequence). According to one embodiment, the entire available frequency spectrum is used (79 hops of 1 MHZ bandwidth each).

A different frequency-hopping channel establishes each piconet. Piconets can co-exist in the Scatternet by sharing the available frequency spectrum through orthogonal frequency hopping sequences. All devices participating on the same piconet are synchronized to this channel. A channel is defined as a very long frequency hopping sequence applying all RF hop frequencies and a phase in this sequence. Thus, a small network of a master 1120 and up to seven slaves 1110, all hopping together on a virtual channel establishes a piconet.

Devices can be dynamically connected and disconnected from a piconet at any time. According to one embodiment, a number of modes are defined corresponding to the type of connection or communications sequence occurring between devices. These modes include standby, inquiry, page, hold and park. Initially, before any connections are made, all devices are in standby mode. In standby mode, a device periodically "listens" for requests to join a piconet. The page and inquiry modes are utilized during the connection process between devices. If no data needs to be transmitted, a device may enter a hold mode in which the device remains connected to a piconet, although data transfer ceases. When devices exit the hold state, data transfer can be restarted instantaneously. Devices may thus remain connected without data transfer in a low power state. When a device enters the hold mode, it retains its active member address on the piconet. The hold mode is typically used when connecting several piconets together.

According to one embodiment, a park mode is also supported, which is similar to the hold mode. However, when a device enters the park mode state, although it remains connected to the piconet, it releases its active member address and thereby ceases active communications with the master device. Because only seven devices can be active on a piconet at a time (limited by a 3-bit piconet active member address), the park mode allows more than seven devices to remain synchronized to a piconet. As they are synchronized, parked devices can jump on and off a piconet very quickly. Devices may thus remain connected without data transfer in a low power state. The park state is typically used for devices where data needs to be sent very infrequently and low power consumption is important (e.g., a security device that needs to transfer data once a minute).

Figure 12:
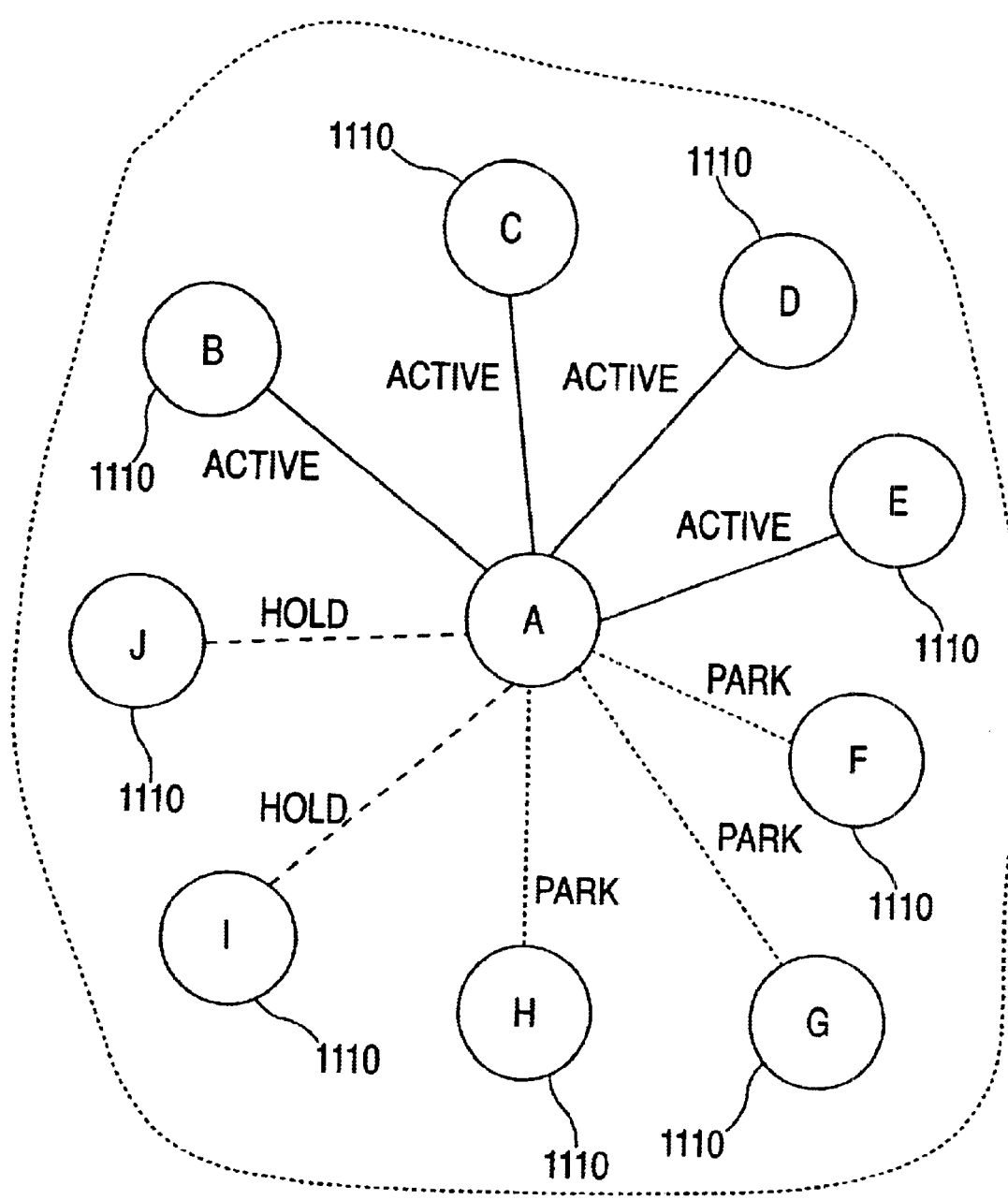
FIG. 12 depicts a piconet consisting of a number of slave devices in active, hold and park modes.

FIG. 12 depicts a number of devices connected to a piconet. Slave devices B, C, D, and E (1110) are actively connected to master A (1120). Slave devices F, G and H (1110) are in park mode but remain synchronized to master A (1120). Finally, slave devices I and J (1110) are connected to master A (112) in hold mode. Because slave devices F, G, and H (1110) remain in park mode (i.e. have released their active member addresses), master A (1120) is able to remain synchronized to nine slave devices (1110) on the piconet 1130. Typically, the configuration depicted in FIG. 12 allows a master 1120 to communicate with any number of slave devices 1110. Master 1120 selectively causes slave devices 1110 to enter or leave the park state, and therefore can remain synchronized with many slave devices 1110.

In one embodiment utilizing the present invention, master 1120 causes each slave 110 on the piconet 1130 to enter an active state in which the slave 1110 is actively polled by master 1120 for a fixed period of time (fixed number of time slots). Upon the expiration of an active state time period, master 1120 causes slave 1110 to enter a hold or park state for a variable amount of time.

In one embodiment utilizing the present invention, master 1120 utilizes the variable time interval in which slave 1110 enters the park or hold states to control the polling rate of slave devices 1110 on piconet 1130. In particular, according to this embodiment, master device 1120 retains a variable for each slave device 1110 corresponding to the amount of time the slave device should remain in the park or hold states upon the expiration of the active mode time period. Master 1120 monitors the activity level of all slave devices during the periods in which the slave devices 1110 are active. In one embodiment, master 1120 computes an activity number for each slave device 1120 by computing the number of time slots the slave 1110 sends data responses to the, master 1120 upon being polled. If the activity of a slave device 1110 during its active period declines below a certain threshold, master 1120 increments the variable corresponding to the time interval the slave should remain in hold or park mode following the current active cycle. On the other hand, if the activity number of a slave device during an active period exceeds a threshold value, master 1120 decrements the variable corresponding to the amount of time the slave should remain in hold or park mode following the current active cycle.

Figure 13:
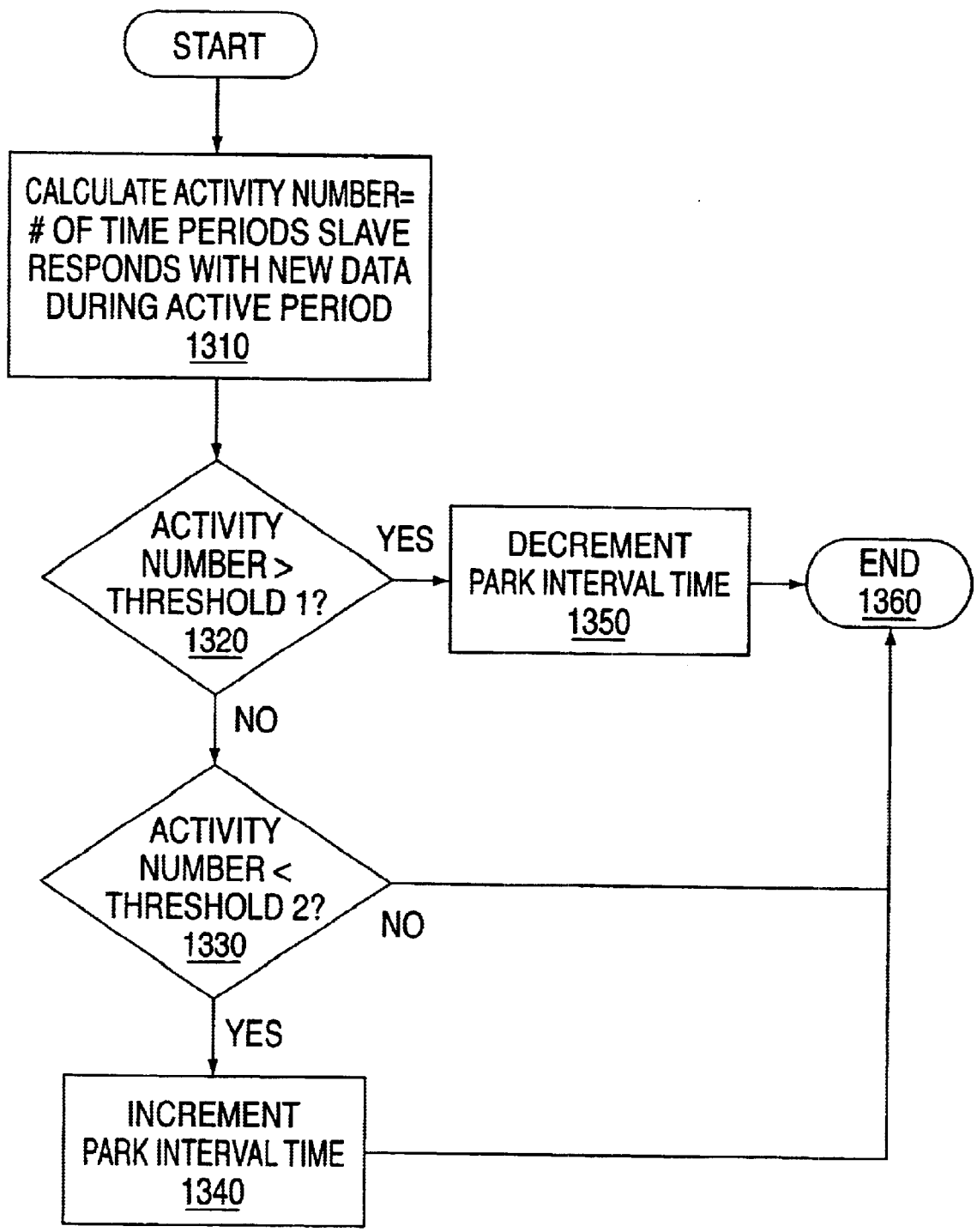
FIG. 13 is a flowchart depicting a master's procedure for the adjustment of the polling rate of a slave devices by increasing the amount of time the slave remains in park mode.

FIG. 13 is a flowchart depicting the adjustment of the polling rate for a slave 1110 by adjusting the park interval for the slave 1110 according to one embodiment of the present invention. In step 1310, master 1120 calculates an activity number for each slave 1110 by determining the number of time periods the slave 1110 responds with new data during the time interval the slave 1110 is actively being polled by the master 1120. In step 1320, master 1120 compares the slave's activity number to a threshold value stored on the master 1120. If the activity number of the slave 1110 exceeds this threshold value ('yes' branch of step 1320), master 1120 decrements a variable corresponding to the park mode interval for the slave 1110 (step 1350) and the procedure ends (step 1360). Otherwise, master 1120 compares the activity number computed in step 1310 to a second threshold value. If the activity number exceeds this second threshold value ('no' branch of step 1330) the procedure ends and master 1120 does not change the park mode interval for the slave 1120. If the activity number of the slave 1120 is below this second threshold value ('yes' branch of step 1330), master 1120 increments a variable corresponding to the park mode interval for the slave 1110 (step 1340) and the procedure ends (step 1360).

By causing slave device 1110 to remain in park or hold more for a longer period of time, master 1120 is effectively decreasing the polling rate of slave device 1110. Inversely, by decreasing the amount of time slave device 1110 enters park or hold, master 1120 is effectively increasing the polling rate of slave device 1110.

What is claimed is:

1. In a system including a polling device and one or more devices that are polled by said polling device, a method for dynamically adjusting a polling rate of said one or more polled devices comprising the steps of:
   (a) calculating an activity number for each polled devices by said polling device; and,
   (b) increasing or decreasing the polling rate of said one or more polled devices by said polling device based upon the activity number calculated for each polled device.

2. The method of claim 1, wherein polling of one or more polled devices by said polling device occurs over a wireless interface.

3. The method of claim 2, wherein said wireless interface is an infrared interface.

4. The method of claim 2, wherein said wireless interface utilizes the ISM frequency band (2.4 GHz).

5. The method of claim 1, wherein said polling device is a host device and said one or more devices that are polled are peripheral devices.

6. The method of claim 1, wherein said polling device and said one or more devices that are polled are peer devices that operate in a master/slave relationship on a permanent basis.

7. The method of claim 1 wherein said polling device and said one or more devices that are polled are peer devices that operate in a master/slave relationship on a transient basis.

8. The method of claim 1, wherein step (a) comprises the following steps:
   (a-1) incrementing a counter of said polling device for each poll of a polled device by the polling device;
   (a-2) incrementing a counter of said polling device for each poll response sent by a polled device to the polling device; and,
   (a-3) calculating a ratio of poll requests for which a polled device returned data to a total number of poll requests sent by the polling device by dividing the number of poll responses by the number of poll requests.

9. The method of claim 1, wherein step (b) comprises the steps of:
   (b-1) storing a current polling rate for each polled device;
   (b-2) storing a set of threshold values relating an activity number to a polling rate;
   (b-3) adjusting the current polling rate of each polled device by:
      comparing the activity number of each polled device to said threshold values such that:
         if the activity number of a polled device falls below a threshold value for the current polling rate of the polled device, the current polling rate of the polled device is decreased to reflect the activity number of the polled device;
         if the activity number of a polled device exceeds a threshold value supporting a higher polling rate and the polled device is capable of being polled at said higher rate, the current polling rate of the peripheral is increased to reflect the activity number of the polled device.

10. The method of claim 9, wherein the set of threshold values are generated by setting a threshold from one polling rate to another in an increasing direction to a different value from a threshold between said two polling rates in a decreasing direction.

11. The method of claim 1, wherein step (a) comprises calculating a number of time intervals a polled devices utilizes to send data to the polling device.

12. The method of claim 1 wherein step (b) comprises the step of updating a variable representing the interval of time a polled device will remain in an inactive state such that:
   if the activity number is below a threshold value, the value of the variable representing the interval of time the polled device will remain in an inactive state is increased;
   if the activity number exceeds a threshold value, the value of the variable representing the interval of time the polled device will remain in an inactive state is decreased.

13. The method of claim 12 wherein said inactive state is a park state.

14. The method of claim 12 wherein said inactive state is a hold state.

15. A polling device for dynamically adjusting a polling rate of one or more polled devices by said polling device, comprising a computer system in said polling device adapted to:
   (a) calculate an activity number of each polled device;
   (b) increase or decrease a polling rate of a polled device based upon the calculated activity number of the device.

16. The device of claim 15 wherein said computer system is further adapted to:
- record a number of device poll requests sent to a polled device;
- record a number of device poll responses received from a polled device;
- calculate an activity number of a polled device by taking the ratio of device poll responses sent from the polled device to the number of poll requests sent to the polled device.

17. The device of claim 16, wherein said computer system is further adapted to:
- store a set of threshold values relating an activity number to a polling rate;
- adjust the current polling rate of each polled device by comparing the activity number of each polled device to said threshold values such that:
  - if the activity number of a polled device falls below a threshold value for the current polling rate of the polled device, the polling rate of the polled device is decreased to reflect the activity number of the polled device;
  - if the activity number of a polled device exceeds a threshold value supporting a higher polling rate and the polled device is capable of being polled at said higher rate, the polling rate of the peripheral is increased to reflect the activity number of the polled device.

18. The device according to claim 17, wherein the set of threshold values are generated by setting a threshold from one polling rate to another in an increasing direction to a different value from a threshold between said two polling rates in a decreasing direction.

19. The device of claim 15, wherein said computer system is further adapted to calculate a number of time intervals a polled device uses to send data to the polling device during a period of time the polled device is in an active state.

20. The device of claim 19, wherein said computer system is further adapted to:
- store a set of threshold values;
- store a variable corresponding to an interval of time a polled device will remain in an inactive state;
- adjust a current polling rate of each polled device by comparing the activity number of each polled device to said threshold values such that:
  - if the activity number of a polled device falls below a threshold value, the variable corresponding to the interval of time the polled device will remain in an inactive state is increased;
  - if the activity number of a polled device exceeds a threshold value the variable corresponding to the interval of time the polled device will remain in an inactive state is decreased.

21. The device of claim 15, wherein polling of one or more polled devices by said polling device occurs over a wireless interface.

22. The device of claim 21, wherein said wireless interface is an infrared interface.

23. The device of claim 21, wherein said wireless interface utilizes the ISM frequency band (2.4 Ghz).

24. The device according to claim 15, wherein said polling device is a host device and said polled devices are peripheral devices.

25. The device according to claim 15, wherein said polling device and said one or more polled devices are peer devices that operate in a master/slave relationship on a permanent basis.

26. The device according to claim 15, wherein said polling device and said one or more polled devices are peer devices that operate in a master/slave relationship-on a transient basis.

27. The device of claim 15, wherein computer system further includes:
- a controller interface;
- memory for storing computer instructions and data;
- a transceiver coupled to the controller interface for wireless transmission of device poll requests and receipt of device poll responses.

28. The device according to claim 27, wherein said transceiver is an infrared transceiver.

29. The device according to claim 27, wherein said transceiver operates in the ISM frequency band (2.4 Ghz).

30. The device of claim 27, wherein said controller interface is adapted to:
- store a current polling rate value for each polled device;
- generate device poll requests to polled devices;
- record a number of device poll requests sent to a polled device;
- record a number of device poll responses received from a polled device;
- calculate an activity number of a polled device;
- store a set of threshold values;
- adjust a current polling rate of each polled device based upon the activity number of a polled device.

31. The device according to claim 27, wherein said controller interface includes a plurality of wireless device ports.

32. The device according to claim 27, wherein the computer system further includes an encoder/decoder coupled between the controller interface and the transceiver.

33. In a system including a polling device and one or more devices that are polled by said polling device, a program storage device, readable by a computer system, comprising: instructions stored thereon for causing the computer system to:
- (a) calculate an activity number of each polled device;
- (b) increase or decrease a polling rate of a polled device based upon the calculated activity number of the device.

34. The program storage device of claim 33, wherein the instructions to calculate the activity number of a polled device comprise instructions for:
- (a-1) incrementing a counter implemented as a variable in computer memory for each poll sent from the polling device to a polled device;
- (a-2) incrementing a counter implemented as a variable in computer memory for each poll response sent by a polled device to the polling device;
- (a-3) calculating the ratio of poll requests for which a polled device returned data to the total number of poll requests sent by the polling device by dividing the number of poll responses by the number of poll requests.

35. The program storage device of claim 33, wherein instructions to increase or decrease the polling rate of a polled device based upon the calculated activity level of the device comprise instructions for:
- (b-1) storing a current polling rate for each polled device;
- (b-2) storing a set of threshold values relating an activity number to a particular polling rate;
- (b-3) adjusting the current polling rate of each polled device by comparing the activity number of each polled device to said threshold values such that:

if the activity number of a polled device falls below a threshold value for the current polling rate of the polled device, the current polling rate of the polled device is decreased to reflect the activity number of the polled device;

if the activity number of a polled device exceeds a threshold value supporting a higher polling rate and the polled device is capable of being polled at said higher rate, the current polling rate of the peripheral is increased to reflect the activity number of the polled device.

36. The program storage device of claim 35, wherein the set of threshold values are generated by setting a threshold from one polling rate to another in an increasing direction to a different value from a threshold between said two polling rates in a decreasing direction.

37. The program storage device of claim 33, wherein the instructions to calculate the activity number of a polled device comprise instructions for calculating a number of time intervals the polled devices uses to send data to the polling device.

38. The program storage device of claim 33, wherein instructions to increase or decrease the polling rate of a polled device based upon the calculated activity level of the device comprise instructions for:

storing a variable corresponding to the interval of time a polled device will remain in an inactive state;

if the activity number is below a threshold value, the value of the variable representing the interval of time said polled device will remain in an inactive state is increased;

if the activity number exceeds a threshold value, the value of the variable representing the interval of time said polled device will remain in an inactive state is decreased.

39. The program storage device of claim 38 wherein said inactive state is a park state.

40. The program storage device of claim 38 wherein said inactive state is a hold state.

41. The program storage device of claim 33, wherein said polling device is a host device and said polled devices are peripheral devices.

42. The program storage device of claim 33, wherein said polling device and said polled devices are peer devices that operate in a master/slave relationship on a permanent basis.

43. The program storage device of claim 33, wherein said polling device and said polled devices are peer devices that operate in a master/slave relationship on a transient basis.

44. The program storage device of claim 33, wherein polling of one ore more polled devices by said polling device occurs over a wireless interface.

45. The program storage device of claim 44, wherein said wireless interface is an infrared interface.

46. The program storage device of claim 44, wherein said wireless interface utilizes the ISM band (2.4 Ghz).

47. In a system including a polling device and a plurality of devices that are polled by said polling device, a method for dynamically adjusting a polling rate of each of the polled devices comprising the steps of:

(a) calculating an activity number for each polled devices by said polling device; and, (b) increasing or decreasing the polling rate of said one or more polled devices by said polling device based upon the activity number calculated for each polled device.

48. A polling device for dynamically adjusting a polling rate of a plurality of polled devices by said polling device, comprising a computer system in said polling device adapted to:

(a) calculate an activity number of each polled device;

(b) increase or decrease a polling rate of a polled device based upon the calculated activity number of the device.

49. In a system including a polling device and a plurality of devices that are polled by said polling device, a program storage device, readable by a computer system, comprising: instructions stored thereon for causing the computer system to:

(a) calculate an activity number of each polled device;

(b) increase or decrease a polling rate of a polled device based upon the calculated activity number of the device.

50. In a system including a polling device and one or more devices that are polled by said polling device, a method for dynamically adjusting a polling rate of each of the polled devices comprising the steps of:

(a) calculating an activity number for each polled devices by said polling device, wherein the activity number is a ratio of a number of responses received from a polled device to the number of polls sent to the polled device; and, (b) increasing or decreasing the polling rate of said one or more polled devices by said polling device based upon the activity number calculated for each polled device.

51. A polling device for dynamically adjusting a polling rate of one or more polled devices by said polling device, comprising a computer system in said polling device adapted to:

(a) calculate an activity number of each polled device, wherein the activity number is a ratio of a number of responses received from a polled device to the number of polls sent to the polled device;

(b) increase or decrease a polling rate of a polled device based upon the calculated activity number of the device.

52. In a system including a polling device and one or more devices that are polled by said polling device, a program storage device, readable by a computer system, comprising: instructions stored thereon for causing the computer system to:

(a) calculate an activity number of each polled device wherein the activity number is a ratio of a number of responses received from a polled device to the number of polls sent to the polled device;

(b) increase or decrease a polling rate of a polled device based upon the calculated activity number of the device.

* * * * *

UNITED STATES PATENT AND TRADEMARK OFFICE
CERTIFICATE OF CORRECTION

PATENT NO.    : 6,640,268 B1
DATED         : October 28, 2003
INVENTOR(S)   : Mohan Kumar It is certified that error appears in the above-identified patent and that said Letters Patent is hereby corrected as shown below:

Column 14,
Line 42, "a polled devices" should be -- a polled device --.

Column 18,
Lines 1 and 27, "for each polled devices" should be -- for each polled device --.

Signed and Sealed this

Twenty-eighth Day of February, 2006

JON W. DUDAS
*Director of the United States Patent and Trademark Office*